(12) United States Patent
Hagiwara

(10) Patent No.: US 11,313,469 B2
(45) Date of Patent: Apr. 26, 2022

(54) SEALING STRUCTURE

(71) Applicant: NOK CORPORATION, Tokyo (JP)

(72) Inventor: Naoki Hagiwara, Shizuoka (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 16/760,485

(22) PCT Filed: Dec. 14, 2018

(86) PCT No.: PCT/JP2018/046082
§ 371 (c)(1),
(2) Date: Apr. 30, 2020

(87) PCT Pub. No.: WO2019/167383
PCT Pub. Date: Sep. 6, 2019

(65) Prior Publication Data
US 2020/0386315 A1     Dec. 10, 2020

(30) Foreign Application Priority Data
Feb. 27, 2018  (JP) .............................. JP2018-032669

(51) Int. Cl.
F16J 15/3204       (2016.01)
(52) U.S. Cl.
CPC ................. *F16J 15/3204* (2013.01)
(58) Field of Classification Search
CPC .... F16J 15/00; F16J 15/02; F16J 15/46; F16J 15/48; F16J 15/50; F16J 15/52;
(Continued)

(56) References Cited

U.S. PATENT DOCUMENTS 3,854,733 A    12/1974  Wilson
9,316,259 B2 *  4/2016  Itou ..................... F16C 33/7856
(Continued)

FOREIGN PATENT DOCUMENTS

EP    0646738    4/1995
EP    1998089    12/2008
(Continued)

OTHER PUBLICATIONS

International Search Report issued in International Patent Application No. PCT/JP2018/046082, dated Mar. 19, 2019.
(Continued)

*Primary Examiner* — Nathan Cumar
(74) *Attorney, Agent, or Firm* — Greenblum & Bernstein, P.L.C.

(57) ABSTRACT

A sealing structure includes a sealing device including a first seal lip having a first seal-lip end, and a support ring that supports the first seal lip; and a plurality of members that define an attachment space into which the sealing device is attached, the members including an inner peripheral wall arranged on the inner periphery side of the sealing device, a first end wall arranged on one axial end of the sealing device, and a second end wall arranged on another axial end of the sealing device. The first seal-lip end has a certain amount of interference with the inner peripheral wall and the first end wall so that its radial reaction force radially presses the support ring outward and its axial reaction force presses the support ring toward the second end wall.

6 Claims, 4 Drawing Sheets

(58) Field of Classification Search
CPC ...... F16J 15/32; F16J 15/3204; F16J 15/3216; F16J 15/322; F16J 15/3232; F16J 15/3236
USPC .......................................................... 277/565
See application file for complete search history.

(56) References Cited

U.S. PATENT DOCUMENTS

| | | | |
|---|---|---|---|
| 9,816,560 B2 * | 11/2017 | Nakai | ...................... F16C 19/06 |
| 2007/0246219 A1 | 10/2007 | Mannella et al. | |
| 2008/0315527 A1 | 12/2008 | Ristic et al. | |

FOREIGN PATENT DOCUMENTS

| | | |
|---|---|---|
| FR | 93711 | 5/1969 |
| JP | 2-93170 | 4/1990 |
| JP | 2010-223369 | 10/2010 |
| JP | 2016-114124 | 6/2016 |
| JP | 2017-133540 | 8/2017 |

OTHER PUBLICATIONS

Extended European Search Report (EESR) issued in European Patent Application No. 18908252.2, dated Oct. 26, 2021.

* cited by examiner

SEALING STRUCTURE

FIELD

The present disclosure relates to a sealing structure which can be used in sealing technology.

BACKGROUND

For example, in a conventional sealing structure which is disclosed in Japanese Patent Laid-Open Publication No. 2010-223369, a sealing device 61 is attached into an attachment space 54 which is defined by a plurality of members 51, 52, and 53 as shown in FIG. 3. Typically, an O ring 71 which has a circular shape as viewed in a cross section is compressed when used as the sealing device 61.

BRIEF SUMMARY

Technical Problem

As shown in FIG. 4, a lip seal 81 can be attached instead of the O ring 71 in order to provide different sealing effects depending on directions and the like. The lip seal 81 includes a seal lip 82 and a support ring 83 which supports the seal lip 82. The seal lip 82 has a seal-lip end 82a which does not contact an inner peripheral wall 55 but contacts only an end wall 56 of the attachment space 54.

The typical attachment space 54 is an annular space which is defined by the inner peripheral wall 55, the first end wall 56, a second end wall 57, and an outer peripheral wall 58 as shown in FIG. 3. The inner peripheral wall 55 is formed on the inner-peripheral side of the sealing device 61. The first end wall 56 is formed on one axial end of the annular sealing device 61. The second end wall 57 is formed on another axial end of the sealing device 61. The outer peripheral wall 58 is formed on the outer-peripheral side of the sealing device 61.

In such arrangement, under constraints of production processes, by dimensional reasons or the like, the outer peripheral surface 81a may not contact the outer peripheral wall 58, that is, a gap d may appear between the outer peripheral surface 81a and the outer peripheral wall 58 as in the case of the lip seal 81 shown in FIG. 4. In this case, the outer peripheral wall 58 cannot serve to coaxially position the lip seal 81 with a center axis O of the attachment space 54 (cannot be used for centering the lip seal 81). Accordingly, the lip seal 81 is eccentrically arranged with respect to the center axis O of the attachment space 54. As a result, its sealing surface will unevenly contact the outer peripheral wall in its circumferential direction. This uneven contact my affect its sealing effects.

Also in this case, if the outer peripheral wall 58 does not contact the outer peripheral surface 81a of the lip seal 81, the outer peripheral wall 58 does not serve to position the lip seal 81. As a result, the attachment space 54 is substantially defined as the space which is surrounded by the inner peripheral wall 55, the first end wall 56, the second end wall 57, and the lip seal 81.

An object of the present disclosure is to provide a sealing structure which can be accurately positioned in an attachment space.

Solution to Problem

A sealing structure according to the present disclosure includes
  a sealing device including
    a first seal lip having a first seal-lip end, and
    a support ring that supports the first seal lip; and
  a plurality of members that define an attachment space into which the sealing device is attached, the members including
    an inner peripheral wall arranged on the inner periphery side of the sealing device,
    a first end wall arranged on one axial end of the sealing device, and
    a second end wall arranged on another axial end of the sealing device,
  wherein the first seal-lip end has a certain amount of interference with the inner peripheral wall and the first end wall so that its radial reaction force radially presses the support ring outward and its axial reaction force presses the support ring toward the second end wall.

Advantageous Effects

A sealing device according to the present disclosure can be accurately positioned in an attachment space.

DETAILED DESCRIPTION

Figure 1:
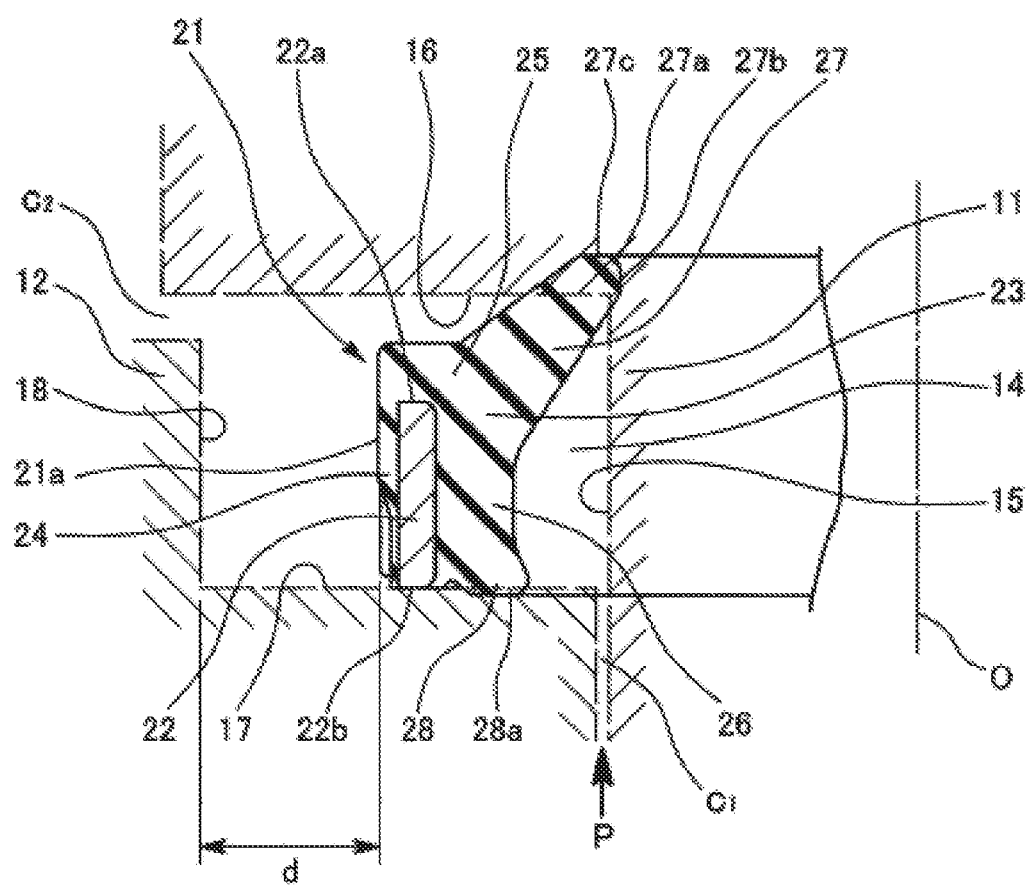
FIG. 1 is a cross-sectional view showing a principal part of a sealing structure according to a first embodiment.

As shown in FIG. 1, a sealing structure according to a first embodiment includes a lip seal 21 (sealing device) which is attached into an attachment space 14. The attachment space 14 is defined by a plurality of members 11 and 12. The plurality of members 11 and 12 and the attachment space 14 are shown by dashed lines, that is, the lip seal 21 is shown in its free state before it is attached into the attachment space. The attachment space 14 is also referred to as an attachment groove from viewpoint of its shape.

The plurality of members 11 and 12 include an inner-periphery-side seal attachment member (inner-periphery-side seal housing) 11, and an outer-periphery-side seal attachment member (the outer-periphery-side seal housing) 12 which is arranged on the outer periphery side of the inner-periphery-side seal attachment member 11. A rotational shaft can be used as the inner-periphery-side seal attachment member 11.

The attachment space 14 is formed as annular space that is surrounded by an inner peripheral wall 15, a first end wall 16, a second end wall 17, and the sealing device 21. The inner peripheral wall 15 has a cylindrical surface that is formed on the inner-periphery-side seal attachment member 11. The first end wall 16 is a flat surface perpendicular to the axis of the sealing device 21, and is arranged on one axial end (upper end in FIG. 1) of the inner-periphery-side seal attachment member 11 of the sealing device 21. The second end wall 17 is a flat surface perpendicular to the axis of the sealing device 21, and is arranged on another axial end (lower end in FIG. 1) of the outer-periphery-side seal attachment member 12 of the sealing device 21.

The attachment space 14 is formed as annular space that is surrounded by the inner peripheral wall 15, the first end wall 16, the second end wall 17, and an outer peripheral wall 18 which has a cylindrical surface that is formed on the outer-periphery-side seal attachment member 12. The annular sealing device 21 is surrounded from its inner, upper, outer, and lower sides by the inner peripheral wall 15, the first end wall 16, the second end wall 17, and the outer peripheral wall 18, respectively. In this arrangement, under constraints of production processes, by dimensional reasons or the like, the outer peripheral wall 18 may not contact the outer peripheral surface 21a of the lip seal 21. Accordingly, a gap d appears between the outer peripheral wall 18 and the outer peripheral surface 21a. As a result, the attachment space 14 is defined as the space which is surrounded by the inner peripheral wall 15, the first end wall 16, the second end wall 17, and the sealing device 21.

In the attachment space 14, an inner-periphery-side gap c1 appears between the inner peripheral wall 15 and the second end wall 17, and an outer-periphery-side gap c2 appears between the first end wall 16 and the outer peripheral wall 18. The lip seal is required to prevent leakage of an enclosed fluid from the inner-periphery-side gap c1 to the outer-periphery-side gap c2.

The lip seal 21 includes a support ring (lip support ring or reinforcement ring) 22 and an elastic rubber member 23. The support ring 22 supports or reinforces the lip seal 21, and is formed of a rigid material such as metal. The support ring 22 has outer and inner peripheral surfaces, and first and second end surfaces 22a and 22b which are arranged on one and another axial ends.

The elastic rubber member 23 is fixed to and overlaid on the support ring 22 by cross linking. The elastic rubber member 23 includes an outer periphery covering part 24 which covers an outer peripheral surface of the support ring 22, an end surface covering part 25 which covers the first end surface 22a, and an inner periphery covering part 26 which covers an inner peripheral surface of the support ring 22. The outer periphery covering part 24, the end surface covering part 25, and the inner periphery covering part 26 are integrally formed as a unitary member. The elastic rubber member 23 can cover the second end surface 22b or not cover the second end surface 22b. However, the elastic rubber member 23 would preferably not cover the second end surface 22b. In this case, because the second end surface 22b directly contacts the second end wall 17 of the attachment space 14, the second end surface 22b supports the lip seal 21 when a pressure is applied to the lip seal 21. As a result, the lip seal 21 can be stably held in its proper orientation. Therefore, the lip seal 21 can have a high resistance to pressure.

In addition, an annular seal lip 27 (first seal lip) is integrally formed with the elastic rubber member 23.

The seal lip 27 extends from the inner periphery side of the lip seal 21 and one axial end (upper end in FIG. 1) of the lip seal 21 in a slant direction toward the radially interior side and the one axial end. A seal-lip end 27a (first seal-lip end) contacts the inner peripheral wall 15 and the first end wall 16 when the lip seal is attached. More specifically, an inner periphery part 27b of the seal-lip end 27a contacts the inner peripheral wall 15, and an axial end 27c of the seal-lip end 27a contacts the first end wall 16.

The seal-lip end 27a of the seal lip 27 has a predetermined amount of interference with the inner peripheral wall 15 when contacting the inner peripheral wall 15. Accordingly, when the seal-lip end 27a contacts the inner peripheral wall 15, a radial reaction force is produced and pushes the entire periphery of the support ring 22 radially outward so that the support ring 22 is positioned in its radial direction.

Also, the seal-lip end 27a of the seal lip 27 has a predetermined certain amount of interference with the first end wall 16 when contacting the first end wall 16. Accordingly, when the seal-lip end 27a contacts the first end wall 16, an axial reaction force is produced and pushes the support ring 22 toward the second end wall 17 so that the support ring 22 is positioned in its axial direction.

The seal-lip end 27a of the seal lip 27 is pushed to a corner of a groove of the attachment space 14 in which the inner peripheral wall 15 and the first end wall 16 intersect with each other.

In addition, an annular auxiliary seal lip 28 (second seal lip) is integrally formed with the elastic rubber member 23.

The auxiliary seal lip 28 extends from the inner periphery side of the lip seal 21 and another axial end (lower end in FIG. 1) of the lip seal 21 in a slant direction toward the radially interior side and the another axial end. Tight contact between the lip seal 21 and the second end walls 17 is created by pressing a seal-lip end 28a (second seal-lip end) to the second end wall 17. Instead of this shape, the auxiliary seal lip 28 may have a protruding shape or bead shape.

According to the sealing structure of this embodiment, the seal-lip end 27a contacts both the inner peripheral wall 15 and the first end wall 16. In addition to this, the seal-lip end 27a has a predetermined amount of interference with the inner peripheral wall 15 and the first end wall 16. Consequently, radial and axial reaction forces can be produced.

The radial reaction force presses the entire periphery of the support ring 22 radially outward. More specifically, the radial reaction force will be uniformly applied to the entire periphery of the support ring 22. As a result, even if the support ring 22 is eccentrically arranged with respect to the center axis O of the attachment space 14, the support ring 22 can be shifted in a radial direction so that the support ring 22 is concentrically positioned with respect to the center axis O of the attachment space 14. Also, the axial reaction force pushes the support ring 22 toward the second end wall 17 so that the support ring 22 is positioned in its axial direction. Consequently, the lip seal 21 can be accurately positioned in the attachment space 14 both in its radial and axial directions.

Parts of the lip seal 21 other than the seal lip 27 have an inner diameter greater than the diameter of the inner peripheral wall 15. The lip seal 21 has an outer diameter smaller than the diameter of the outer peripheral wall 18. For this reason, the lip seal 21 may be eccentrically arranged with respect to the center axis O of the attachment space 14 when attached into the attachment space 14.

Because the seal lip 27 according to this embodiment has an inner diameter smaller than the diameter of the inner peripheral wall 15, a radial reaction force will be produced. As a result, the lip seal 21 can be concentrically positioned with respect to the center axis O of the attachment space 14 by the radial reaction force.

Also, the parts of the lip seal 21 except the seal lip 27 have an axial length smaller than a distance between the first and second end walls 16 and 17. For this reason, the lip seal 21 may rattle in its axial direction in the attachment space 14 when attached into the attachment space 14.

Because the lip seal 21 including the seal lip 27 according to this embodiment has an axial length longer than the distance between the first and second end walls 16 and 17, an axial reaction force will be produced. As a result, the axial reaction force can push the lip seal 21 to the second end wall 17 so that the lip seal 21 can be positioned in its axial direction. Consequently, the lip seal 21 can be accurately positioned in the attachment space 14 both in its radial and axial directions.

In other words, the lip seal 21 can be automatically positioned both in the radial and axial directions by the radial and axial reaction forces. That is, such positioning work is not required separately from the attachment work of the lip seal 21. Therefore, the attachment workability of the lip seal 21 can be improved.

In addition, because the lip seal 21 is fastened to the seal attachment members 11 and 12 by using the seal lip 27 which is pushed to the inner peripheral wall 15 and the first end wall 16, and the support ring 22 which is pushed to the second end wall 17, the lip seal 21 will not tilt even when an enclosed-fluid pressure P is applied to the lip seal 21. For this reason, the lip seal 21 can be stably held in its proper orientation. Therefore, the lip seal 21 can have a high resistance to pressure.

In addition, because both the seal lip 27 and the auxiliary seal lip 28 have their self-sealing effect which varies depending on directions, they have a high sealing effect on the enclosed-fluid pressure P.

Figure 2:
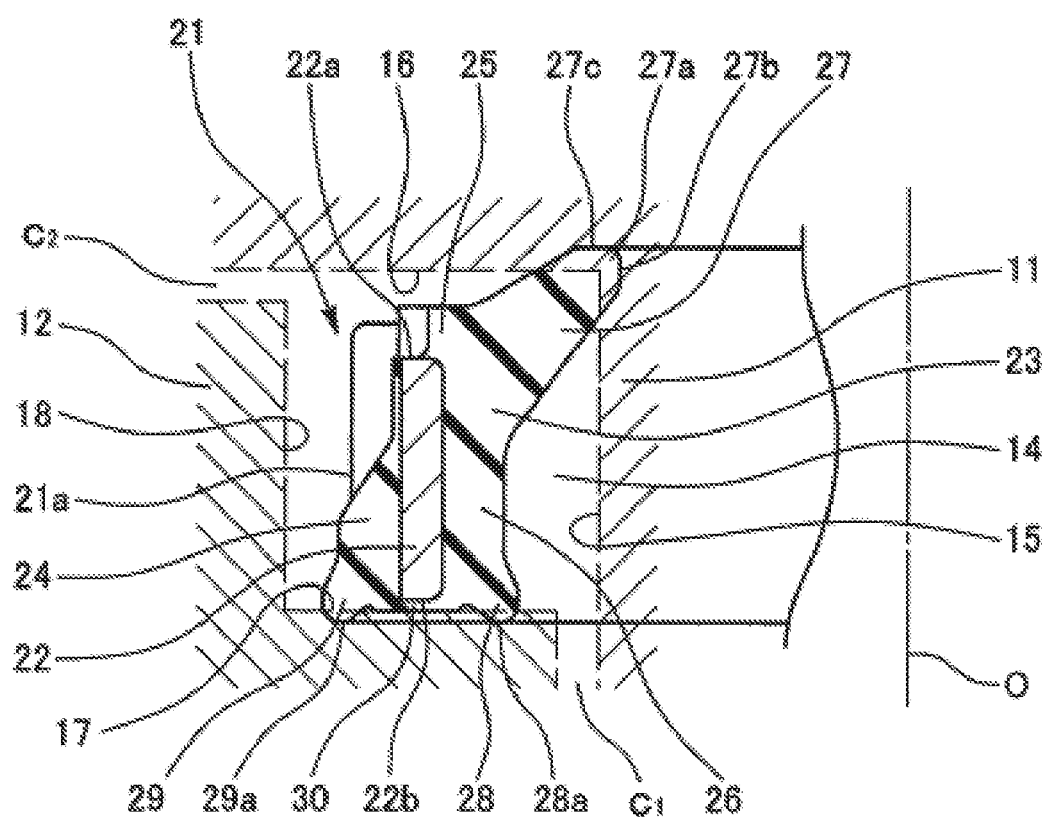
FIG. 2 is a cross-sectional view showing a principal part of a sealing structure according to a second embodiment.
Figure 3:
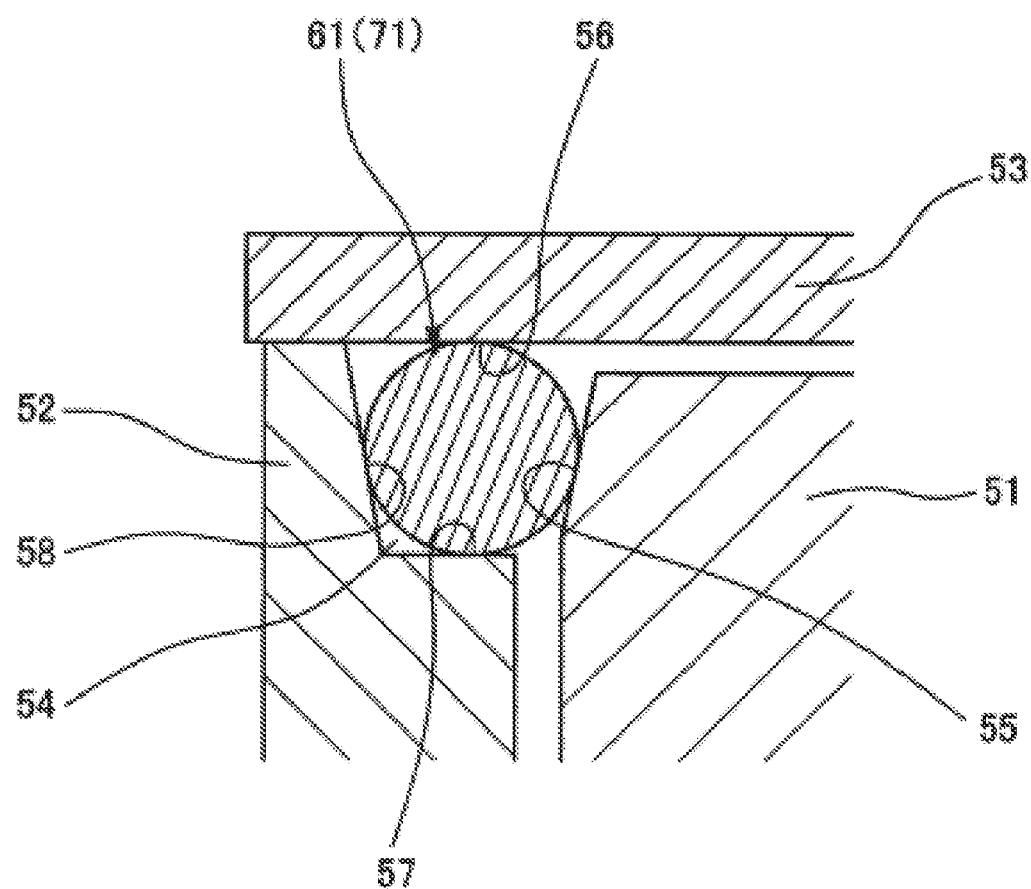
FIG. 3 is a cross-sectional view showing a structure of a conventional sealing device.
Figure 4:
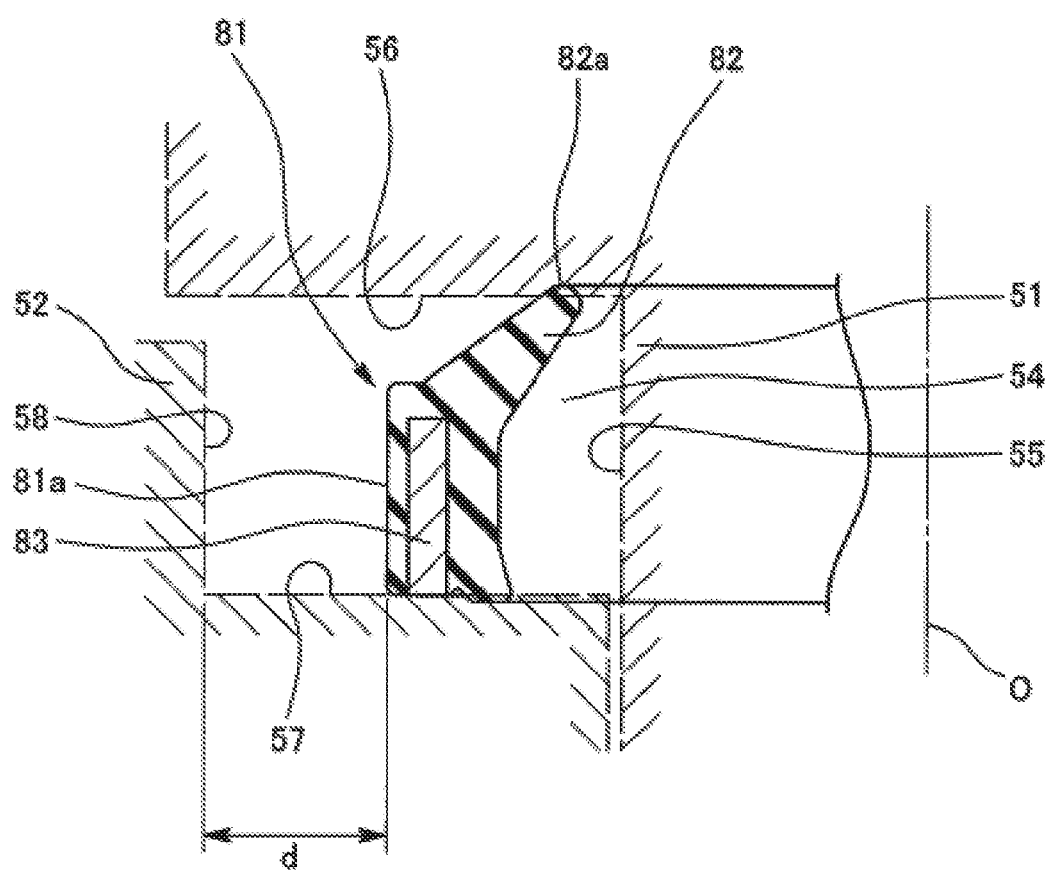
FIG. 4 is a cross-sectional view showing a principal part of a sealing structure according of a comparative example.

A sealing device 21 according to a second embodiment is now described with reference to FIG. 2. The sealing device 21 according to this embodiment includes an outer-periphery-side seal lip 29 (third seal lip) in addition to the seal lip 27 and the auxiliary seal lip 28 in the first embodiment.

The sealing structure according to the first embodiment is constructed based on the premise that a positive pressure (higher pressure) is applied to the lip seal 21 from the inner-periphery-side gap c1 between the inner peripheral wall 15 and the second end wall 17. Contrary to this, in the case in which a negative pressure is applied, a positive pressure is applied to the lip seal 21 from the outer-periphery-side gap c2 between the first end wall 16 and the outer peripheral wall 18. In this case, the lip seal 21 is required to prevent leakage under such a positive pressure.

In this case, because such a positive pressure which is applied from the outer-periphery-side gap c2 pushes the seal lip 27 toward the inner peripheral wall 15, it can be considered that leakage from a gap which appears between the lip seal 21 and the inner peripheral wall 15 hardly occurs. However, such a positive pressure from the outer-periphery-side gap c2 will be applied in a direction in which the auxiliary seal lip can open. For this reason, a fluid may flow from the outer-periphery-side gap c2 into the inner-periphery-side gap c1 through a gap (not shown) which may be produced between the lip seal 21 and the second end wall 17 by the positive pressure. In order to block this flow, the lip seal 21 according to this embodiment includes the outer-periphery-side seal lip 29 as shown in FIG. 2.

The outer-periphery-side seal lip 29 extends from the outer periphery side of the lip seal 21 and another axial end (lower end in FIG. 2) of the lip seal 21 in a slant direction toward the radially exterior side and the another axial end. A seal-lip end 29a (third seal-lip end) contacts the second end wall 17. Instead of this shape, the outer-periphery-side seal lip 29 may have a protruding shape or bead shape.

In the case in which both the auxiliary seal lip 28 and the outer periphery side seal lip 29 are arranged on the another axial end (lower side in FIG. 2) of the lip seal 21, by reasons of rubber molding, a thin coupling part 30 is formed on the second end surface 22b of the support ring 22. The auxiliary seal lip 28 and the outer periphery side seal lip 29 are coupled to each other by the coupling part 30 as a unitary member. In this case, the coupling part 30 is sandwiched between the second end surface 22b of the support ring 22 and the second end wall 17 when the lip seal contacts the second end wall 17. An interval between the support ring 22 and the second end wall 17 is preferably minimized compared with an interval between the support ring 22 and the first end wall 16.

INDUSTRIAL APPLICABILITY

The present disclosure can be applied to the field of cars and their auxiliaries, general or construction machinery, and the like. Also, the present disclosure can be used for car engine seals, fuel pump seals, and the like.

REFERENCE SIGNS LIST

11 . . . Inner-periphery-side seal attachment member
12 . . . Outer-periphery-side seal attachment member
14 . . . Attachment space
15 . . . Inner peripheral wall
16 . . . First end wall
17 . . . Second end wall
18 . . . Outer peripheral wall
21 . . . Lip seal (Sealing device)
21a . . . Outer peripheral surface
22 . . . Support ring
22a, 22b . . . End surface
23 . . . Elastic rubber member
24 . . . Outer periphery covering part
25 . . . End surface covering part
26 . . . Inner periphery covering part
27 . . . Seal lip
27a, 28a, 29a . . . End
27b . . . Inner periphery part
27c . . . Axial end
28 . . . Auxiliary seal lip
29 . . . Outer-periphery-side seal lip
30 . . . Coupling part
c1 . . . Inner-periphery-side gap
c2 . . . Outer-periphery-side gap

The invention claimed is:

1. A sealing structure comprising:
   a sealing device including
      a first seal lip having a first seal-lip end, and
      a support ring that supports the first seal lip; and
   a plurality of members that define an attachment space into which the sealing device is attached, the plurality of members including
      an inner peripheral wall arranged on an inner periphery side of the sealing device,
      a first end wall arranged on one axial end of the sealing device, and
      a second end wall arranged on another axial end of the sealing device,
   wherein the first seal-lip end has a certain amount of interference with the inner peripheral wall and the first end wall so that its radial reaction force radially presses the support ring outward and its axial reaction force presses the support ring toward the second end wall,
   the plurality of members include an outer peripheral wall arranged on an outer periphery side of the sealing device, and
   the sealing device is attached to the attachment space without direct contact with the outer peripheral wall.

2. The sealing structure according to claim 1, wherein the sealing device includes a second seal lip that extends toward a radially interior side and the second end wall, and has a second seal-lip end, and
   the second seal-lip end contacts the second end wall.

3. The sealing structure according to claim 1, wherein
the sealing device includes a third seal lip that extends
toward a radially exterior side and the second end wall,
and has a third seal-lip end, and
the third seal-lip end contacts the second end wall.

4. A sealing structure comprising:
a sealing device including
a first seal lip having a first seal-lip end, and
a support ring that supports the first seal lip; and
a plurality of members that define an attachment space
into which the sealing device is attached, the plurality
of members including
an inner peripheral wall arranged on an inner periphery
side of the sealing device,
a first end wall arranged on one axial end of the sealing
device, and
a second end wall arranged on another axial end of the
sealing device,
wherein the first seal-lip end has a certain amount of
interference with the inner peripheral wall and the first
end wall so that its radial reaction force radially presses
the support ring outward and its axial reaction force
presses the support ring toward the second end wall,
the sealing device includes a second seal lip that extends
toward a radially interior side and the second end wall,
and has a second seal-lip end, and
the second seal-lip end directly contacts the second end
wall.

5. The sealing structure according to claim 4, wherein
the sealing device includes a third seal lip that extends
toward a radially exterior side and the second end wall,
and has a third seal-lip end, and
the third seal-lip end contacts the second end wall.

6. A sealing structure comprising:
a sealing device including
a first seal lip having a first seal-lip end, and
a support ring that supports the first seal lip; and
a plurality of members that define an attachment space
into which the sealing device is attached, the plurality
of members including
an inner peripheral wall arranged on an inner periphery
side of the sealing device,
a first end wall arranged on one axial end of the sealing
device, and
a second end wall arranged on another axial end of the
sealing device,
wherein the first seal-lip end has a certain amount of
interference with the inner peripheral wall and the first
end wall so that its radial reaction force radially presses
the support ring outward and its axial reaction force
presses the support ring toward the second end wall,
the sealing device includes a third seal lip that extends
toward a radially exterior side and the second end wall,
and has a third seal-lip end, and
the third seal-lip end contacts the second end wall.

* * * * *